US00RE47332E

(19) United States
(12) Reissued Patent
Hart

(10) Patent Number: US RE47,332 E
(45) Date of Reissued Patent: Apr. 2, 2019

(54) GOLF TRAINING SYSTEM AND METHOD

(71) Applicant: Monroe Hart, Homewood, IL (US)

(72) Inventor: Monroe Hart, Homewood, IL (US)

(21) Appl. No.: 15/228,193

(22) Filed: Aug. 4, 2016

Related U.S. Patent Documents

Reissue of:
(64) Patent No.: 8,808,103
Issued: Aug. 19, 2014
Appl. No.: 12/613,765
Filed: Nov. 6, 2009

(51) Int. Cl.

| | |
|---|---|
| ***A63B 69/36*** | (2006.01) |
| ***A63B 69/00*** | (2006.01) |
| ***A63B 53/00*** | (2015.01) |
| ***A63B 53/14*** | (2015.01) |
| *A63B 60/00* | (2015.01) |
| *A63B 71/06* | (2006.01) |

(52) U.S. Cl.
CPC ..... *A63B 69/3608* (2013.01); *A63B 53/007* (2013.01); *A63B 53/14* (2013.01); *A63B 69/0057* (2013.01); *A63B 69/0059* (2013.01); *A63B 69/3644* (2013.01); *A63B 69/3667* (2013.01); *A63B 69/3676* (2013.01); *A63B 69/3641* (2013.01); *A63B 2060/0085* (2015.10); *A63B 2071/0694* (2013.01); *A63B 2209/10* (2013.01); *A63B 2210/50* (2013.01); *A63B 2225/09* (2013.01); *A63B 2225/093* (2013.01)

(58) Field of Classification Search
CPC ..... A63B 69/3608; A63B 69/3667
See application file for complete search history.

(56) References Cited

U.S. PATENT DOCUMENTS

| | | | | | |
|---|---|---|---|---|---|
| 2,735,424 | A | * | 2/1956 | Benjamin | 602/17 |
| 2,737,432 | A | * | 3/1956 | Jenks | 346/44 |
| 3,779,549 | A | * | 12/1973 | MacNeil | 473/446 |
| 3,868,116 | A | * | 2/1975 | Ford et al. | 473/218 |
| 4,948,142 | A | * | 8/1990 | Taber | 473/275 |
| 5,085,437 | A | | 2/1992 | Leitao | |
| 5,141,489 | A | * | 8/1992 | Sereboff | 602/18 |
| 5,156,401 | A | | 10/1992 | Hodgkiss | |
| 5,203,567 | A | | 4/1993 | Erlinger et al. | |
| 5,209,484 | A | * | 5/1993 | Randall | 473/265 |
| 5,248,146 | A | | 9/1993 | Viets et al. | |
| 5,259,621 | A | | 11/1993 | Keefer | |
| 5,275,570 | A | * | 1/1994 | Hicks | 434/252 |
| 5,447,312 | A | * | 9/1995 | Nixon et al. | 473/212 |
| 5,501,646 | A | * | 3/1996 | Miller | 482/11 |
| 5,569,096 | A | * | 10/1996 | Lee | 473/248 |
| 5,651,680 | A | * | 7/1997 | Levy | 434/252 |

(Continued)

FOREIGN PATENT DOCUMENTS

GB 2416997 A * 2/2006 ..... A63B 69/3608

OTHER PUBLICATIONS

Merriam-Webster's Collegiate Dictionary, 10th ed., 1998, p. 1313 (i.e., definition of "vertical").*

*Primary Examiner* — Jeffrey L Gellner
(74) *Attorney, Agent, or Firm* — Wood, Phillips, Katz, Clark & Mortimer

(57) ABSTRACT

The training system comprises a base assembly, an upright extension, a chin support member, and a putter. In use, the training system positions the user's overall-body prior to and throughout the execution of a putt, and teaches proper putting technique, thus improving the user's putting accuracy. The chin support engages the chin of the user, preventing movement of the user's head.

10 Claims, 7 Drawing Sheets

AMENDED

(56) References Cited

U.S. PATENT DOCUMENTS

| | | | | |
|---|---|---|---|---|
| 5,711,716 | A | 1/1998 | O'Brien et al. | |
| 5,904,624 | A | 5/1999 | Martinez | |
| 6,843,730 | B1 * | 1/2005 | Bellagamba | 473/216 |
| 7,033,282 | B1 | 4/2006 | Flood | |
| 7,033,284 | B2 | 4/2006 | Yoshimura | |
| 7,055,908 | B1 * | 6/2006 | Williams | 297/392 |

* cited by examiner

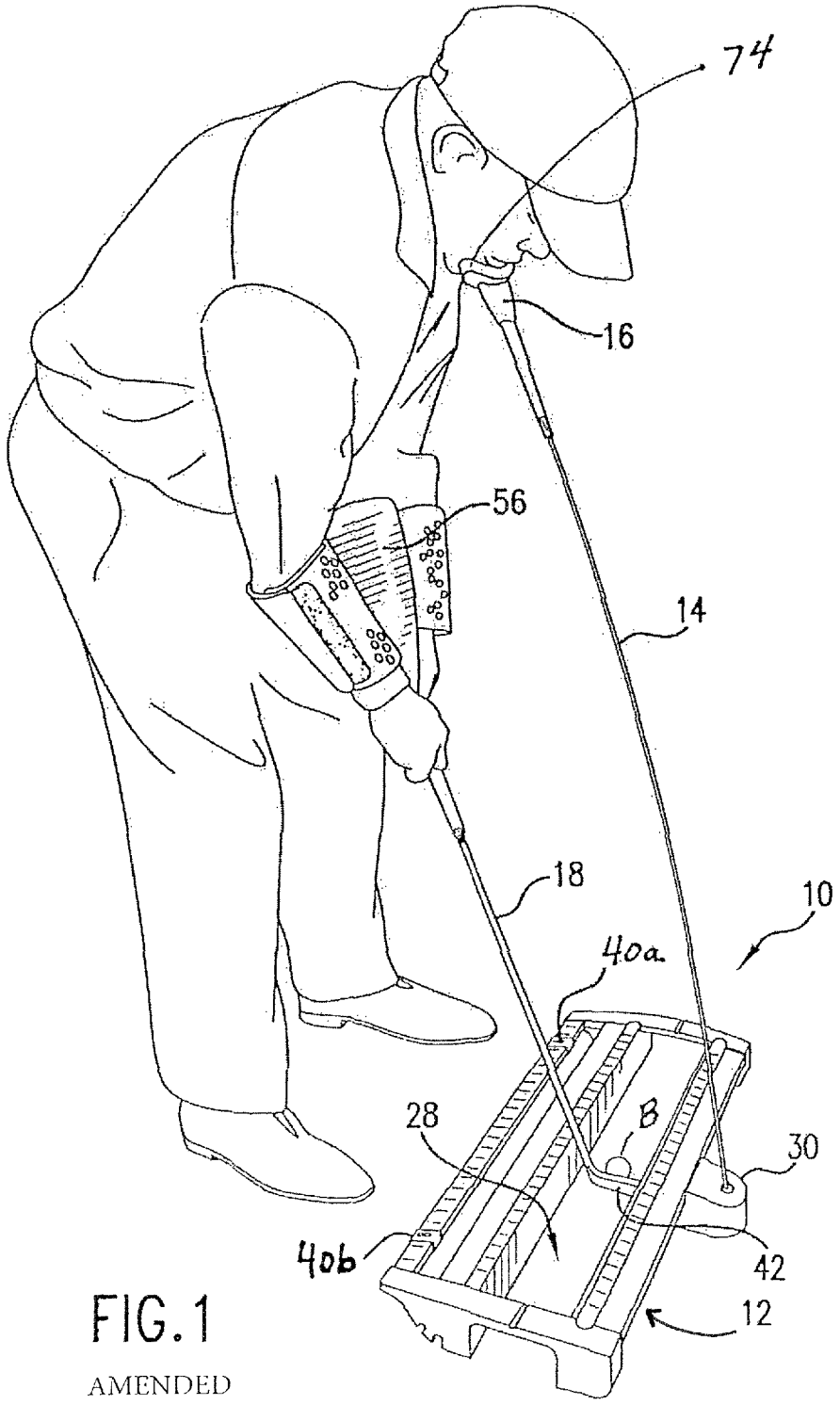
FIG. 1
AMENDED

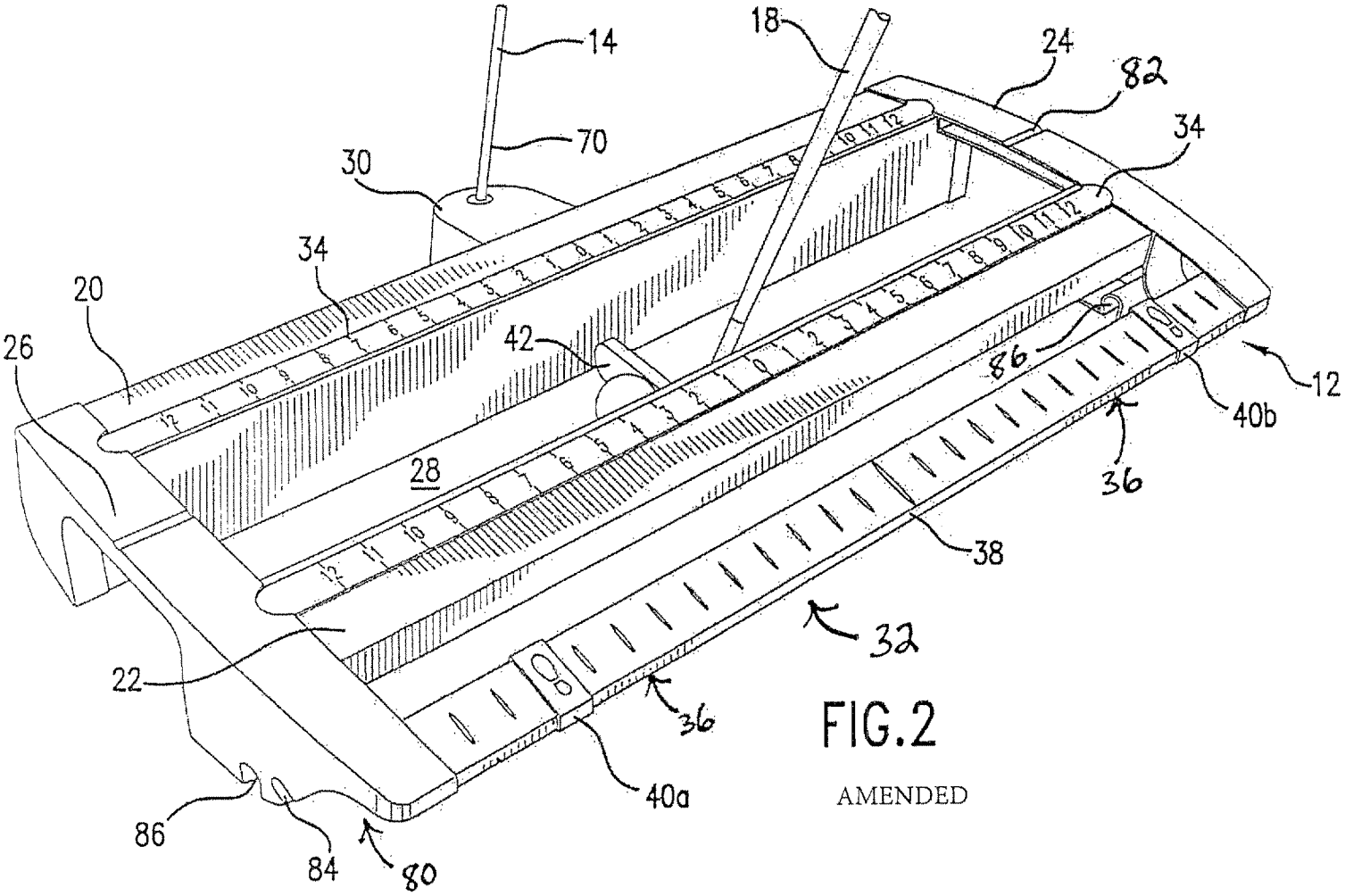
FIG. 2
AMENDED

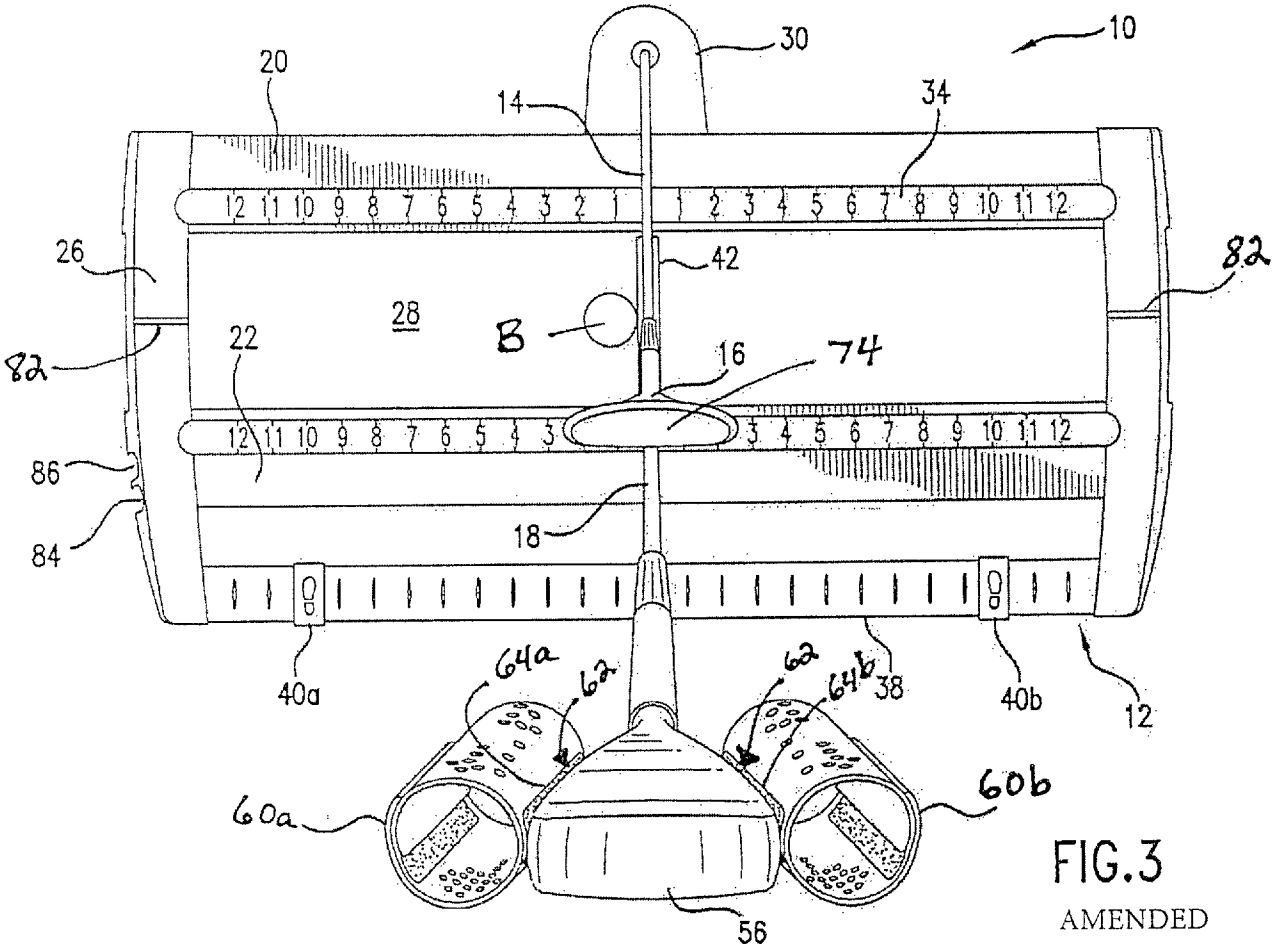
FIG. 3
AMENDED

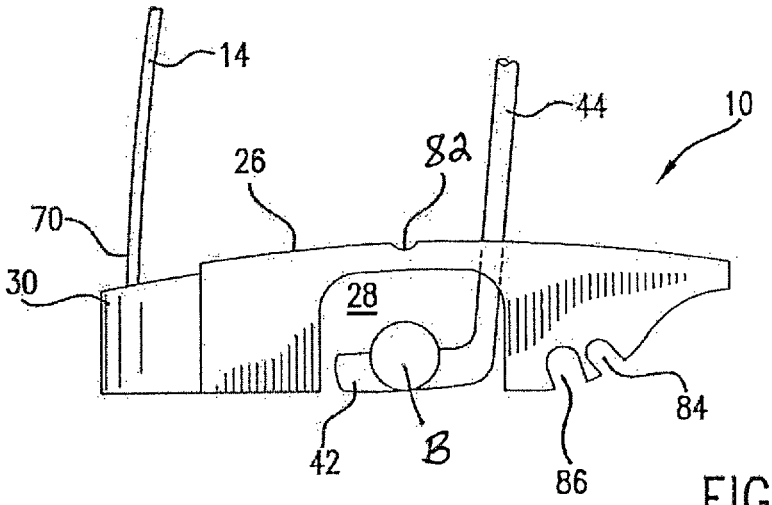
FIG.4
AMENDED
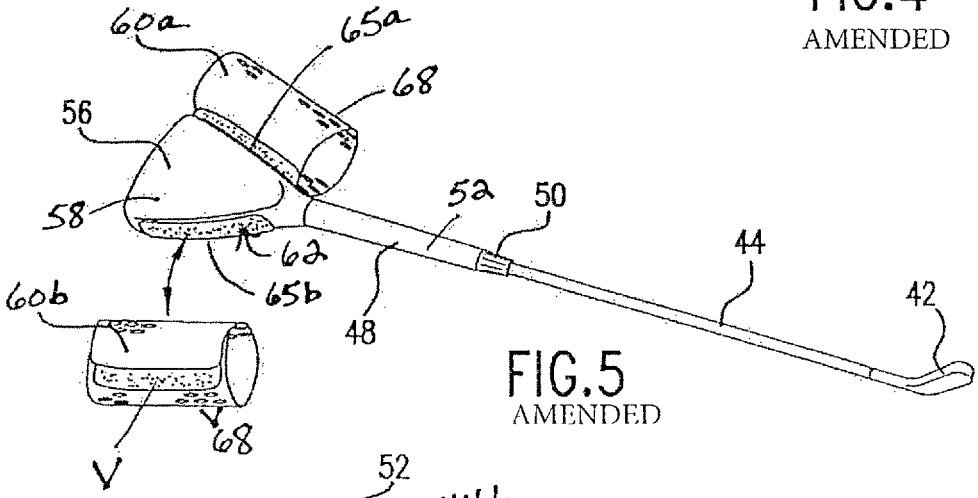
FIG.5
AMENDED
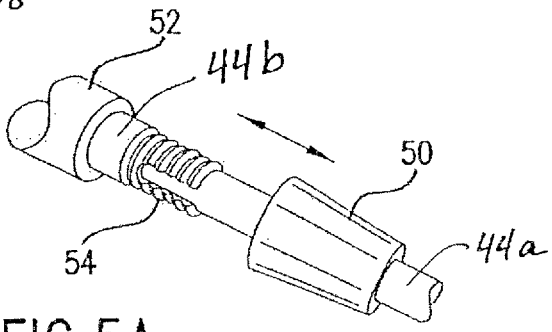
FIG.5A
AMENDED

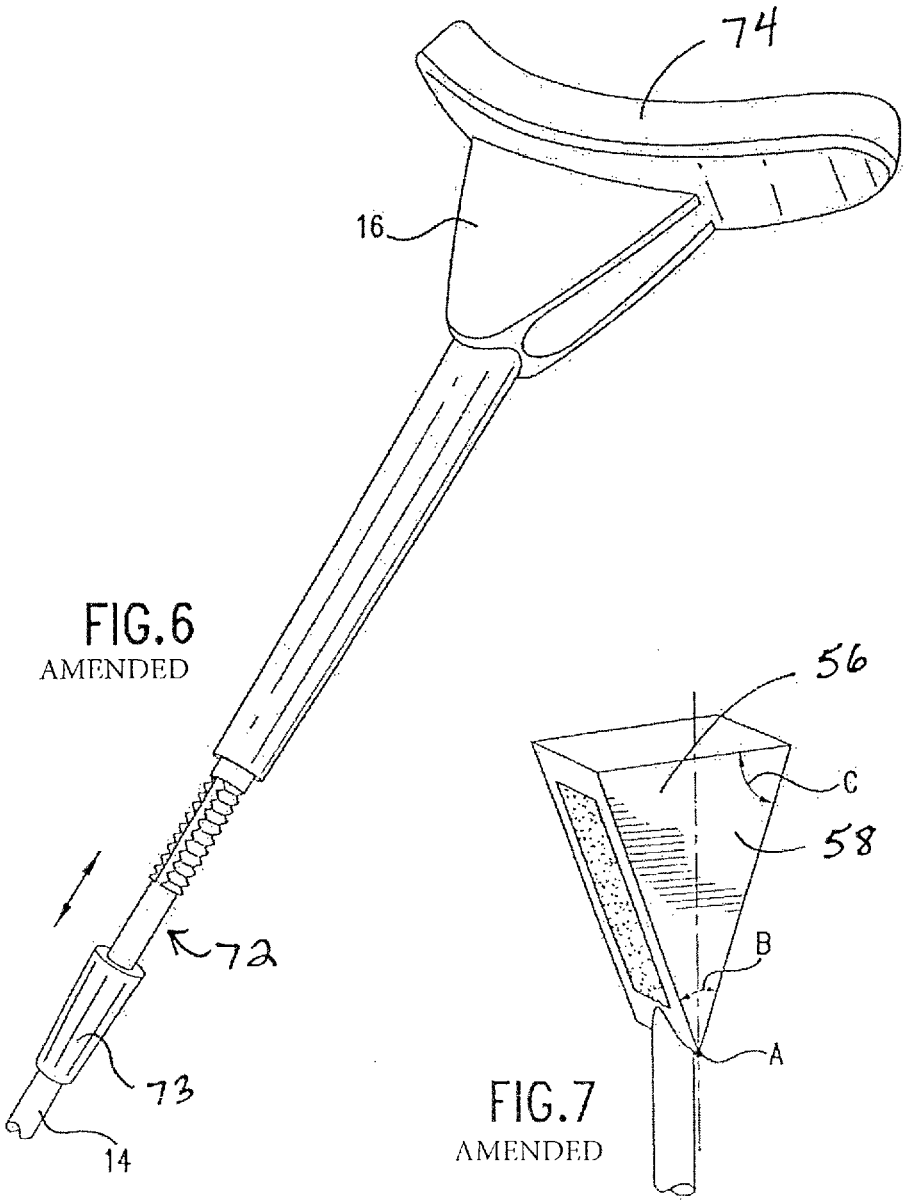
FIG.6
AMENDED
FIG.7
AMENDED

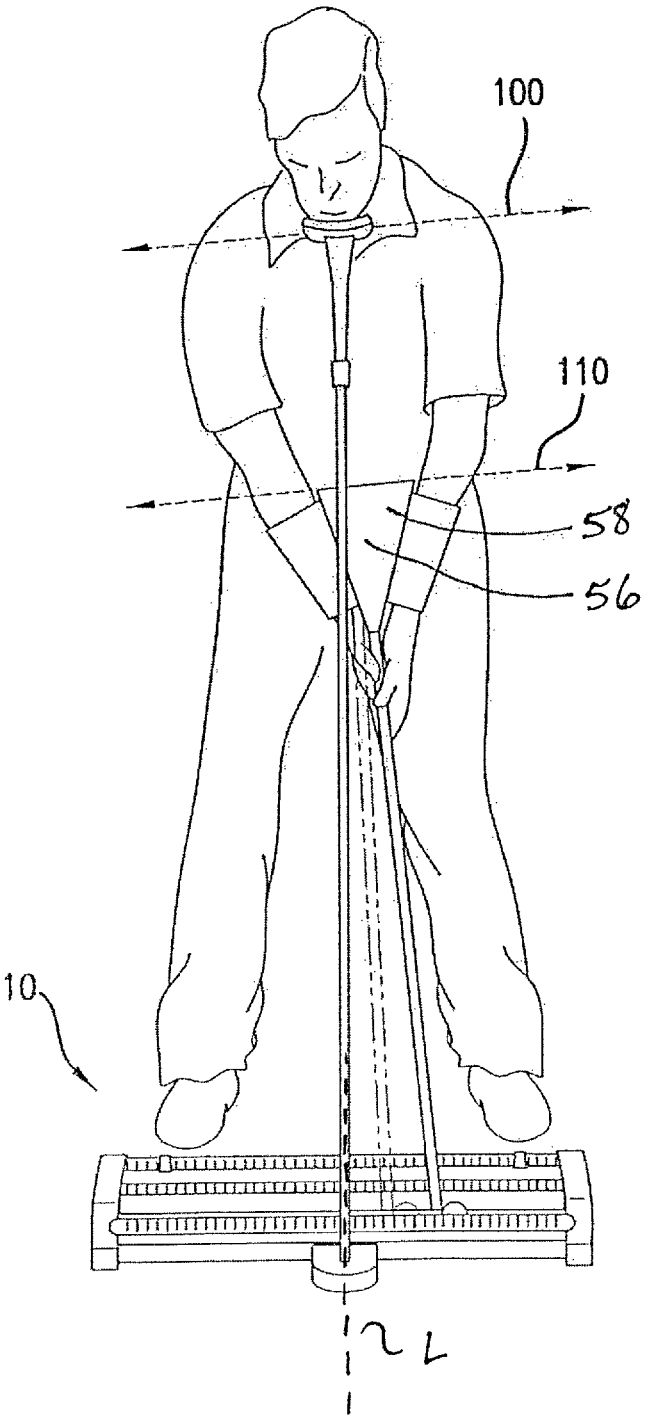
FIG.8
AMENDED

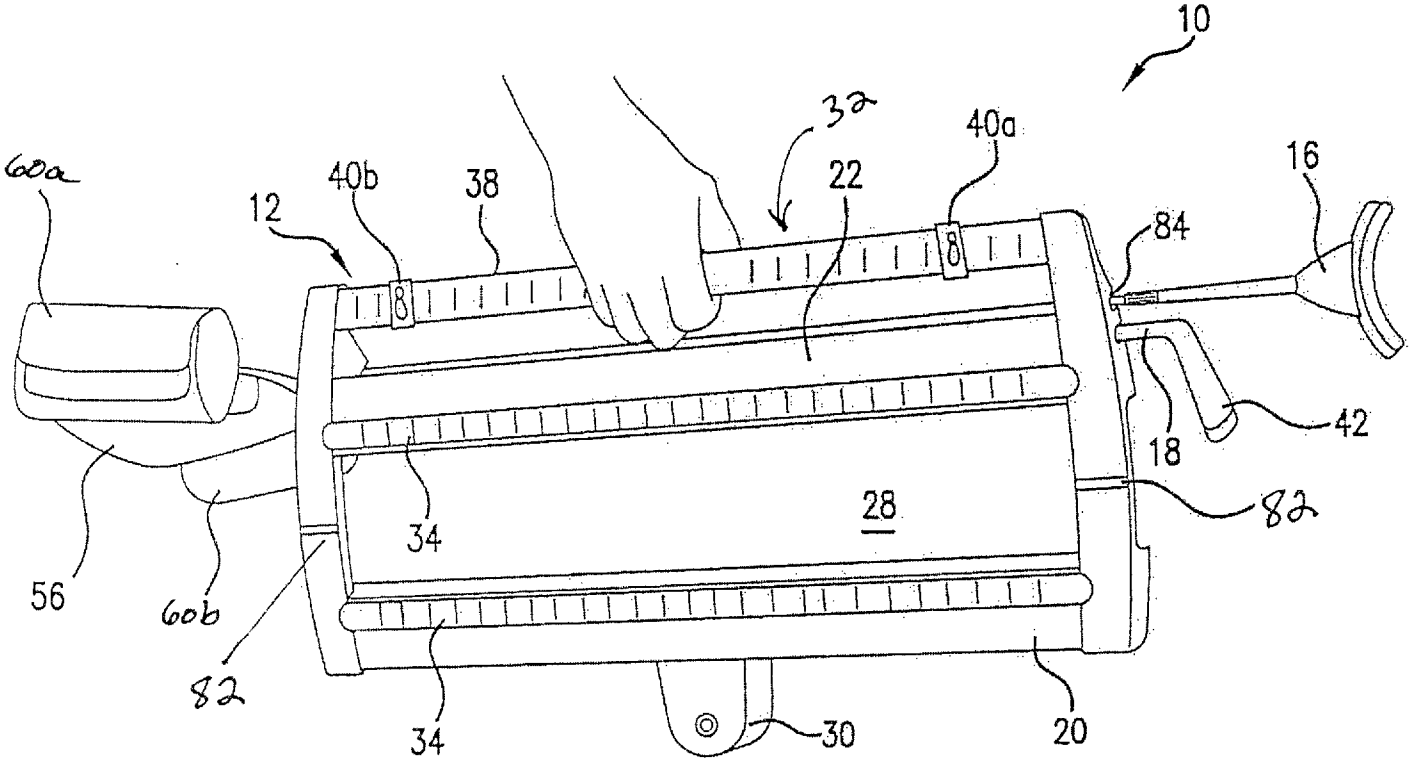
FIG. 9
AMENDED

GOLF TRAINING SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates generally to a golf training system. More particularly, the present invention relates to a golf training system and method for improving a user's putting technique.

BACKGROUND OF THE INVENTION

Golf training systems, used for improving a user's golfing game, are generally known in the art. One example of such system discloses a golf swing training device, for setting and maintaining proper arm position throughout a full golf swing. This is done by forcing a golfer to keep his or her arms in plane during the entire swing.

U.S. Pat. No. 5,447,312 illustrates a chipping and putting training device. That device has a pair of cuffs, which are joined to one another by a main body. The cuffs position the golfer's forearms, and hold the user's arms and shoulders in place, so that the golfer develops a muscle memory of the correct swing. The device is three-way adjustable to allow vertical, horizontal, and angular positioning of the cuffs and arms relative to one another.

U.S. Pat. No. 3,325,169, illustrates an adjustable arm for holding the golfer's head down during a swing as to keep said golfer's eye on the ball during the execution of a swing. U.S. Pat. No, 6,843,730, illustrates an invention whereby a golfer can be held in a desired position to a golf training apparatus while making practice swings.

Whereas the above-referenced devices and systems are suitable for their intended purposes, none of the prior art discussed disclose a putting training system providing an ulnar assembly and a chin stabilizing assembly, for improving a user's putting technique. Prior art discloses various aspects and segmented approaches to the "golf swing". While the prior art generally addresses the putting process, the aggregation of the putting process as a movement pattern, best understood within a kinesthetic awareness paradigm, has not been addressed.

The present invention takes into account the kinesthetic awareness indicators and the cognitive process involved in assimilating the skill and knowledge of putting. Accordingly, the present golf training system and method is patentable over other prior art in the field.

SUMMARY OF THE INVENTION

It is desirable to provide a golf putting training system for teaching putting technique. It is further desirable to provide a system with an effective design and construction. It is also desirable that such training system and method, enables a user to practice the mechanical technique of putting a golf ball, thereby training the muscle set via a kinesthetic awareness or feedback.

It is desirable that the golf training apparatus has a base and an upright extension in connection with a chin support assembly. The chin support is attached to the upright extension portion and positioned to support the chin of a golfer executing practice putts. The upright extension portion includes a fastener assembly that is affixed to the invention's base and rigidly, attached thereto. The fastener enables the chin support to be raised and/or lowered, such that the chin support can be fitted for use by user's with different heights.

The putter assembly is designed to function within the system's kinesthetic awareness purview. In an alternative embodiment of the present invention, the golf putting training system comprises *a* training putter handle that is removable from the system's training putter and suited to fit a variety of conventional putters.

A base assembly comprises visual cues for aligning the user's feet and body position relative to the ball. Rails are provided, forming a track for achieving a controlled pre and post contact stroke. Bridging members connect the rails and further provide visual cues for sighting the path of the ball and the putter during pre and post contact with the golf ball.

It is also an object of the present invention to provide a golf putting training system which comprises an elongated adjustable putting track as a part of the invention's base that may be increased or decreased in clearance/width, where the user can experience different degrees of difficulty in maintaining a swing travel that is parallel to the inner walls of the track.

It is a further object of the present invention to provide a golf putting practice system that can be readily installed on any conventional golf surface. Further novel features and other objects of the present invention will become notably apparent from the following detailed description and discussion, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the golf training system, in accordance with the present invention, illustrating a user engaged with the system;

FIG. 2 is a perspective view of the base assembly of the present invention;

FIG. 3 is a top view of the present invention, illustrating the components of the base assembly and visual indicators;

FIG. 4 is a side view of the base assembly;

FIG. 5 is a perspective view of the putter assembly of the present invention;

FIG. 5a is a exploded perspective view of the adjusting mechanism of the putter assembly;

FIG. 6 is a perspective view of the chin assembly;

FIG. 7 is a partial exploded perspective view of the ulnar assembly illustrating the triangular formation of the ulnar assembly;

FIG. 8 is a front view of a user in engagement with the training system illustrating a putting motion; and, FIG. 9 is a perspective view, illustrating the training system in a compact carrying formation.

DETAILED DESCRIPTION OF THE DRAWINGS

Referring now to the drawings, wherein like numerals indicate like or corresponding parts throughout the several views, and in particular FIG. 1 shows a perspective view of the golf putting training system*/assembly* 10, in accordance with the present invention. The training system 10 comprises a base assembly 12, an upright extension 14, a chin support member 16, and a putter assembly 18. *The chin support member 16 and upright extension 14 make up a chin*

*stabilizing member.* When a user is in engagement with the training system 10, the system 10 positions the user's body in proper formation during the execution of a putting stroke, thereby teaching the user proper putting technique and further improving the user's putting accuracy.

FIGS. 2, 3, and 4, illustrate the base assembly 12, in accordance with the present invention. As shown, the base assembly 12 comprises rails 20 and 22. The base assembly 12 further comprises members 24 and 26. The members 24 and 26 are connected to, and extend along the respective outer portions of the rails 20 and 22, forming a play track 28 or place space 28 therebetween. In this embodiment the base 12 is formed by anodized aluminum extrusion, however, notably it is contemplated that the base 12 can be formed with other material without departing from the scope of the present invention.

The play track space 28 configuration provides clearance for the head *42* of the putter assembly 18 [and putter head 42] to be positioned between the rails 20, 22 and members 24, 26, as further illustrated in FIG. 4. The rails 20, 22 are positioned along the track 28 forming a guidance. The rails 20, 22 force the user, during a putting stroke, to move the putter head 42 in generally straight manner, such that the user doesn't hit the inner side portions of the rails 20, 22. As the user practices movement of the putter *assembly* 18 in a generally straight manner, user's muscle memory is taught a generally straight putting stroke.

The base assembly 12 further comprises a support member 30, a foot gauge assembly 32, *and* a swing measuring gauge 34. The foot gauge assembly 32 extends along the outer portion of the base assembly 12. Notably, it is contemplated that the foot gauge assembly 32 can be positioned at other locations on the base 12, without departing from the scope of the present invention. The foot gauge assembly 32 includes a shaft portion 38, a series of marks 36 spaced along the shaft *portion 38*, and one or more [feet] *foot* placement indicators 40a, and 40b. The shaft portion 38 extends along the base assembly 12 in a generally parallel relationship to the rails 20, 22. Notably, the foot gauge assembly 32 is lifted off of the ground or surface, such that a space *80* is formed between the shaft portion 38 and the surface. The space 80 enables the user to position his*/her* feet underneath the shaft portion 38 of the gauge assembly 32, if necessary, thereby enabling the user to get closer to the [putting] *play track* space 28, and the ball *B* positioned therein. In the present embodiment, it is contemplated that the portion 38 of foot gauge 32 is approximately 2" in height above the play surface, however other heights are contemplated, without departing from the scope of the present invention.

The feet placement indicators 40a, 40b are designed to be removably affixed to the shaft portion 38. Further, the feet placement indicators 40a, 40b are configured to be slid along the length of the shaft [portions] *portion* 38, such that the user can position the feet placement [40a, 40b] indicators *40a, 40b* at preferred location on the shaft *portion* 38. The feet placement indicators 40a, 40b, *and* foot gauge 32 with marks *36* formed on the shaft portion 38 cooperatively provide guidance and visual cues. In cooperation, these components guide the user as to where to position his*/her* body in relationship to the ball *B* located in the space 28.

The swing gauge 34 provides guidance to the user when performing the [put] *putt*. The putting gauge 34 is positioned along the rails 20, 22 such that the user when focusing on a ball positioned in the playing space [26] *28* can also see the swing gauge 34, thereby providing a visual cue. In one embodiment, the gauge 34 comprises three (3) aluminum extrusions capped off with two (2) injection molded parts.

The swing gauge 34 provides visual guidance to the user on the distance to move the putter *assembly* 18 during the putting motion, which will be further described later in this application. The members 24, 26 comprise center-line indicator marks 82, which assist the user in center placing the ball *B* within the space 28. The marks 82 further provide a visual cue to the user during the putting stroke to assist the user in keeping the putter in the middle of the space 28 during the stroke.

[FIG. 5 illustrates] *FIGS. 5 and 5A illustrate* the putter assembly 18, in accordance with the present invention. The putter *assembly* 18 comprises a head 42 (i.e. striking surface), a shaft component 44, a grip 52 and an ulnar assembly 56. In one embodiment of the present invention, the putter [18 has] head 42 *is* configured for left or right handed putting strokes, which can be a two-sided faced putter *assembly* 18, also generally referred to as a non-directional putter *assembly* 18. In such embodiment, the putter *assembly* 18 enables a left handed or right handed user to use the putter assembly 18. The shaft component 44 extends generally from and between the handle 48 of the putter *assembly 18* and the head 42.

In one embodiment of the present invention, the shaft component 44 has an adjustable length. In such embodiment, the shaft component has a first shaft 44a, a second shaft 44b, and a fastening mechanism 50. In this embodiment, [a] *the fastening mechanism 50 is in the form of a* tapered thread coupling [50 is] illustrated [is] connected to the first shaft 44a. The putter grip 52 is connected to the second shaft 44b, and has a tapered external thread 54 with one or more mirrored [relives] *reliefs* on opposing sides. The coupling 50 has internal threads (not shown) configured for attachment with the external threads 54, so as to form a locking mechanism. The shaft component 44 is adjusted to a preferred length by the user, and then the coupling mechanism 50 is positioned into engagement with the end portion of the handle 48 causing engagement between the internal and external threads, and thereby locking the [shaft 44] *shafts 44a, 44b* in place. It is further contemplated that another fastening mechanism used to secure the shaft inside of the handle area can be used, without departing from the scope of the present invention. As such, the putter *assembly 18* can be adjusted from a 32 inch putter to a 38 inch putter in length.

The training putter *assembly* 18 has at the upper portion, *what is* referred to here as the ulnar assembly 56. The ulnar assembly 56 is configured for positioning the ulnar region, or forearm region of the arm in a desirable position for performing accurate putting action. The [Ulnar] *ulnar* assembly is rigidly, however removably affixed to the shaft *component* 44, so as to restrict undesirable [the] "breaking" of the wrist during the putting. As aforementioned, the positioning of the user's arms, and particularly *the* ulnar region of the arms is critical in the teaching and performance of accurate putting. As shown, ulnar assembly 56 generally comprises an ulnar base 58, a first arm cuff 60a and a second arm cuff 60b. The ulnar base 58 is generally configured in the shape of an inverted triangle. The base can be formed from an injection mold foam, providing a generally lightweight structure. The upper portion of the shaft *component 44* is formed from an injection molded core. The [grip] *ulnar assembly* 56 is fitted along the upper portion.

The arm cuffs 60a and 60b are configured for removable attachment to the ulnar base 58. In one embodiment of the present invention, the ulnar assembly 56 is equipped with a [velcro] *Velcro®-type* system 62. As demonstrated, the [velcro] *Velcro®-type* system 62 comprises a series of [velcro]

*Velcro®-type* strips 64a and 64b positioned along the respective arm cuffs 60a and 60b, and the respective locations on the ulnar base 58 at 65a and 65b. This system 62 enables the cuffs 60a, and 60b to be easily and comfortably attached, and detached from the base 58, as desired. Notably, it is contemplated that other suitable means for attaching the ulnar cuffs 60a, 60b and the base [68] *58* exist without departing from the scope of the present invention. The cuffs 60 are configured for adjustment along the forearm portion of the arm.

As shown in FIG. 5, the cuffs 60 are adjustable for receiving different sized user's forearms. In the present embodiment, the size of the cuffs are adjustable into different sizes using *a* Velcro®-*type material V*. In the present embodiment, the cuffs 60 comprise a series of openings 68 for providing ventilation to the arm region. In this embodiment, the cuffs 60 are made of a foam lightweight material, however, it is contemplated that the cuffs can be constructed with other forms of plastic, foam, cloth, or other material, without departing from the scope of the present invention.

The human ulnar nerve comes from the medial cord of the brachial plexus, and runs interior on the posterior and medial (posteromedial) aspects of the humerus down the arm, going behind the medial epicondyle, through the cubical tunnel, at the elbow (where it is exposed for a few centimeters, just above the joint). Because of the mild pain and tingling throughout the forearm associated with an inadvertent impact of the nerve at this point, it is usually called the "funny bone". The [Ulnar] *ulnar* nerve can be trapped or pinched in various ways as it proceeds down the arm from the [Brachial] *brachial* plexus to the ring and middle fingers. The ulnar cuffs 60a, 60b, are designed to engage the ulnar nerve along the forearm so as to alert the user to slight movements affecting the ulnar nerve, especially when the user has the ulnar cuffs on his/*her* arms and improperly moves his/*her* wrists during putting action.

In FIGS. 4 and 6, there is shown [the] *an* extension 70, in accordance with the present invention. The extension 70 is connected to the base 12 of the training system 10 at the support 30. The extension 70 has a generally elongated configuration. As shown, the extension 70 has an adjusting feature 72, enabling the user to adjust the extension 70 to a desired length. In one embodiment, the extension provides an adjusting collar [72] *73* for [adjusting] locking the extension 70 in at a preferred length. The adjusting collar [72] *73* can be loosened to adjust the length of the extension 70, and also tightened by adjusting a collar mechanism. The adjustable collar [72] *73* provides for one to six inches of adjustment of the extension 70. Notably, it is contemplated that the extension 70 can be adjusted whatever desired length, without departing from the scope of the present invention.

FIG. 7 is a [cross-sectional] *perspective* view of the ulnar assembly 56, further illustrating the triangular formation of the assembly 56. As shown, the ulnar assembly 56 has an apex "A". The cuffs 60a and 60b *are* attached along the sides of the ulnar assembly 56 *and* are separated about the apex "A" by an angle "B" of approximately 40 degrees, whereby angle "C" is approximately 70 degrees. This angular configuration of the ulnar assembly 56 provides for proper user arm configuration when holding the putter *assembly* 18. Notably, it is contemplated that other formations of the *ulnar* base *58* with variable triangular angles for creating a desired grip formation are contemplated without departing from the scope of the present invention.

As further shown in FIG. 6, the extension *14* is connected to a chin stabilizing member 74. The chin stabilizing member *74* is configured for engagement with the user's head. [In the present embodiment, the stabilizing member 74 is a chin stabilizer, which engages the user's chin.] The chin [stabilizer] *stabilizing member* 74 is configured so as to engage [users] *the user's* chin. When the player is in a centered position with the base, the [stabilizer] *stabilizing member 74* engages the user's chin below the tip of his/*her* chin. The [stabilizer] *stabilizing member* 74 has a padded surface to provide comfort while engaged with the user. The molded foam padded surface provides comfort to the user when the chin is engaged with the chin [assembly] *support member 16*.

The method and use of the training system 10 are illustrated in FIGS. 8-9. As shown in FIG. 8, the user in engagement with the system 10, the line 110 along the top portion of the ulnar assembly 56 inverted triangle remains a constant angle throughout the putting stroke. Taken together, the large muscle constraints along with fine motor awareness precipitated via the use of the invention [of record], afford the kinesthetic awareness or feedback that helps the user(s) to achieve a set of stroke. Further, the full inverted triangular base formed in the ulnar [Segment 56] *base 58* also creates a wedge with the arms. The wedge keeps the arms in this desired formation and constant throughout pre and post contact of the putting stroke resulting in a fulcrum about the cervical curve (given the chin's stagnate position) thereby causing the user to rotate his/*her* shoulders thereabouts. Whereas it is conceivable and predictable that the relationship (angle) between a line drawn along and through the user's shoulders [(10)] *100* movement patterns (any configuration of movements in the same general spatial plane) and a sports skills (specific to a sport event and associated with a particular mechanical purpose) necessary to achieve a level of success and consistency in putting *are realized*. [awareness] *Awareness* of his or her grip and wrist movement during putting process—once the [Ulnar Wraps] *ulnar cuffs 60* are properly closed about the user's arm the user can track of the slightest pressure exerted via the ring and little finger in relationship to those finger's position and the [taughtness] *tautness* of his or her grip about the [training] putter *assembly 18*.

It is crucial to the putting process that the wrist remains [ridged] *rigid* through pre and post contact with the golf ball. The [training] putter *assembly* 18 [of record] extends the inverted triangle [56] of the [Ulnar Segment] *ulnar assembly* 56 to its apex, culminating at the training putter's shaft/hand-grip area.

The method provides that the user adjust the putter assembly length [(1)] to the desired length. The desired length is generally related to the height [an] *and* arm length of the user. The user slides his/*her* forearms in the respective cuffs 60a and 60b. The user affixes his/*her* arms to the putter such that his/*her* arms are formed in a triangular shape, as shown in FIGS. 1, 9 and 10. A ball *B* has been placed in the play *track* space 26 [the]. *The* method further provides that starting with the users's visual focus, the user's chin is positioned at the stabilizing member 74 of adjustable extension 70 above the target ball placed. The telescoping upright extension 70 is adjusted to the user's desired length to accommodate the user's height. The extension 70 is adjusted, however, the extension is not rigid or restricted from side-to-side deflection and can be moved (in a side-to-side manner) by the movement of the golfer's chin. The rigidness of the adjustable extension *70* provides such that the slightest movement in the golfer's chin is detectable to the user.

The extension 70 remains in plain view of the user and can function as an open sight for targeting the ball. The tactile contact between the golfer's chin and the perch[.], interaction, visual, kinesthetic and cognitive between the golfer and the invention [of record] is at the core of and is synergistic to the method of putting as disclosed in "The Putting Answer: A Method and Apparatus for Training Golf Putting," and incorporated herein by reference.

The user [align has] *aligns his/her* body along the centerpoint of the base assembly 12. The user places his*/her* feet in line with the foot indicators 40a, 40b at the desired location. The user places his*/her* chin in contact with the chin stabilizer 74. [Places] *The* putter head *42 is placed* between rails 20, 22. The user grips the putter 18 such that his*/her* arms are firmly secured in the ulnar assembly 56 and pressed against the ulnar *assembly* 56 forming the arms in a triangular configuration.

As shown in FIG. 8, the user's body is positioned along the [assembly] *system* 10, such that the user's chin and chin [stabilizer] *stabilizing member* 74 remain stationary along [plane] *line* 100 during a stroking movement of the putter [18 and] head 42. The method of the present invention contemplates that the user utilizes swing measuring gauge 34 to serve as a guide in determining how far to move the putter head 42 back, during the back stroking motion. For example, the user moves the putter head 42 one inch from the ball as indicated on the swing measuring gauge 34, in order to make the ball travel one foot. In another example, the user moves the putter head 42 three inches from the ball, according to the swing measuring gauge 34, in order to make the ball travel three feet.

The method for training a user comprising the steps of providing a training [assembly] *system* 10 including [a] *the* chin stabilizing [member] *support* 14, putter assembly 18, and [a] base assembly 12. Next, [by] positioning user in a putting body position relative to the training [assembly] *system* 10 and placing the [users] *user's* arms in contact with the putter *assembly* 18. Next, adjusting the chin stabilizing member [14] *74* to a desired length according to the user's height, such that the member is in contact with the user's chin while in putting position, and the [users] *user's* head faces a downward position towards [a] *the play track* space formed in the base assembly*12*, such that the user can see the ball *B* positioned in the space *28. As seen in FIGS. 1 and 8, the chin stabilizing member 14 has a generally linear configuration defining a line L directly in front of a user. The line L extends through the user's chin with the chin stabilizing member 14 bearing against the user's chin.*

Next, position the putter assembly 18 having a putter head 42, in [a provided] *the play track* space 28 located relative to a ball *B* positioned in the space 28. Next, perform a putting stroke motion and striking the ball positioned in the space 28 by moving the [users] *user's* arms and connected putter *assembly* 18 into contact with the ball, and keeping the [users] *user's* head stable by keeping chin in connection with the chin stabilizing member [14] *74* such that the head remains in rigid, non-moving downward facing position.

As shown in FIGS. 2 and [10] *9*, the base assembly 12 of the present invention provides a light weight, easily movable unit. As further shown in the drawings, the base *assembly* 12 has a first formation 84 or opening formed in the lower portion of the base *assembly* 12. The formation [74] *84* is configured for engagement with the putter assembly 18 such that the putter assembly 18 can be removably affixed to the formation. The formation 84 [flex] *flexes* slightly enabling the putter *assembly 18* to be inserted therein and forming a snap-fit connection with the putter *assembly* 18. A second formation 86 is formed in the lower part of the base [18] *assembly 12*. The second formation 86 is configured for engagement with the extension [member 16. The] *14 and the* chin [stabilizer assembly] *support assembly* 16, such that they can be removably attached to the base 12. This compact feature enables the [putting] *training* system 10 and [components] *base 12* to be easily moved from one location to the next. As further shown in FIG. [10] *9*, the gauge *assembly* 32 acts as a carrying handle as well.

What is claimed is:

1. [The] *A* method for training a user comprising the steps of*:* a) [Providing] *providing* a training assembly including a chin stabilizing member having a generally linear configuration *defining a line*, a putter assembly, and a base assembly having a space for receiving the [users] *user's* feet under a shaft portion*;* b) [Positioning] *positioning the* user in a [butting] *putting* position relative to the training assembly and placing the [users] *user's* arms in contact with the putter *assembly* and adjusting the chin stabilizing member to a desired length according to the user's height, such that the *chin stabilizing* member is in contact with the user's chin while in *the* putting position, and the [users] *user's* head faces a downward position towards a *play* space formed [In] *in* the base assembly*;* c) positioning *the* user's feet under a portion of the base assembly and positioning the putter assembly having a putter head[,] in [a provided] *the play* space formed in the base assembly such that the putter head is located relative to a ball, and the putter head and ball [is] *are* positioned in the *play* space[.]*;* d) positioning the user's chin in direct connection with the chin stabilizing member[,] *so that the line of the chin stabilizing member extends through the user's chin in connection with the stabilizing member;* and[.]

e) performing a putting stroke motion by striking the ball positioned in the *play* space with the putter *head*, while simultaneously keeping the [users] *user's* head stable by keeping *the user's* chin in direct connection with the chin stabilizing member such that the *user's* head *is rigidly stabilized by the chin stabilizing member and* remains in a [rigid, non-moving] downward facing position.

2. A training system comprising:

a base assembly, a chin stabilizing member for keeping [the] *a user's* chin stable during use *with the user engaged with the training system*,

[the base assembly positioned in front of the user,] the base assembly having a shaft portion and a foot gauge assembly, the foot gauge assembly having a space formed therein enabling [a] *an engaged* user to position his*/her* feet underneath the shaft portion, and[.]

a chin stabilizing member extending from the base assembly engaging the chin of the *engaged* user*,* wherein when [the] *a* user is *engaged and* positioned in front of the base assembly, the chin stabilizing member having a generally linear configuration [extends] *defining a line* directly from the base assembly, in front of the *engaged* user, and [engaging] *engages* the *engaged* user's chin such that when in contact with the *engaged* user's chin, the *engaged* user's head is stabilized with contact with the *chin* stabilizing member*,*

*the line extending from the base through the chin of the engaged user.*

*3. A method for training a user comprising the steps of:*

*a) obtaining a training assembly including a chin stabilizing member having a generally linear configuration defining a line, a putter assembly, and a base assembly;*

*b) positioning the user in a putting position relative to the training assembly and placing the user's arms in contact with the putter assembly and adjusting the chin stabilizing member to a desired length according to the user's height, such that the chin stabilizing member is in contact with the user's chin while in putting position, and the user's head faces a downward position towards a play space formed in the base assembly;*

*c) positioning the putter assembly having a putter head, in the play space formed in the base assembly such that the putter head is located relative to a ball, and the putter head and ball are positioned in the play space;*

*d) positioning the user's chin in direct connection with the chin stabilizing member so that the line of the chin stabilizing member extends through the user's chin in connection with the chin stabilizing member; and*

*e) performing a putting stroke motion by striking the ball positioned in the play space with the putter head, while simultaneously keeping the user's head stable by keeping the user's chin in direct connection with the chin stabilizing member such that the user's head is rigidly stabilized by the chin stabilizing member and remains in a downward facing position.*

*4. A training system comprising:*

*a base assembly, a chin stabilizing member for keeping an engaged user's chin stable during use,*

*the base assembly having a shaft portion, and*

*the chin stabilizing member extending from the base assembly for engaging the chin of the engaged user,*

*wherein when the engaged user is positioned in front of the base assembly, the chin stabilizing member having a generally linear configuration defining a line directly from the base assembly, in front of the engaged user, and engages the engaged user's chin such that when in contact with the engaged user's chin, the engaged user's head is stabilized with contact with the chin stabilizing member,*

*the line extending through the engaged user's chin.*

*5. A training system comprising:*

*a base assembly defining a play track space situated in front of a user's feet with the user engaged with the training system;*

*a putter assembly comprising a putter head for striking a ball,*

*the putter assembly and base assembly configured so that with the engaged user engaging the putter assembly and engaged with the training system, the engaged user can perform a putting stroke with the putter assembly to thereby move the putter head guidingly within the play track space to strike a ball within the play track space; and*

*a chin stabilizing member with a generally linear configuration defining a line and projecting upwardly from the base assembly in front of the engaged user engaged with the training system and configured to bear against the engaged user's chin to stabilize the engaged user's chin as the engaged user performs a putting stroke,*

*the line extending through the engaged user's chin.*

*6. The training system according to claim 5 wherein the putter assembly comprises an ulnar assembly configured to engage the user's arms with the user engaged with the training system to position the user's arms so as to restrict movement of the user's wrists during a putting stroke.*

*7. The training system according to claim 5 wherein the play track space is bounded by an elongate rail that is configured to guide movement of the putter head during a putting stroke.*

*8. The training system according to claim 5 wherein the play track space is bounded by first and second spaced rails each configured to guide movement of the putter head during a putting stroke.*

*9. A method of performing putting training comprising the steps of:*

*obtaining the training system of claim 5;*

*standing in front of the base assembly and engaging the putter assembly;*

*placing the chin on the chin stabilizing member; and*

*performing a putting stroke with the engaged putter assembly while maintaining the chin on the chin stabilizing member to thereby move the putter head within the play track space.*

*10. A method for a user to train to putt, the method comprising the steps of:*

*obtaining a training assembly having a base assembly and a chin stabilizing member extending upwardly from the base assembly,*

*the chin stabilizing member comprising an upright extension extending upwardly from the base assembly, said upright extension having a generally linear configuration defining a line;*

*assuming a putting position relative to the training assembly with the chin stabilizing member in contact with a chin of the user with the user facing downwardly toward a play space formed in the base assembly and bounded by an elongate rail; and*

*with the user's chin remaining in contact with and rigidly stabilized by the chin stabilizing member, swinging arms of the user in a putting motion to thereby move a putter head within the play space so that the elongate rail guides movement of the putter head in a straight putting path,*

*wherein the chin stabilizing member extends upwardly from the base assembly so that the line is directly in front of the user.*

* * * * *